(12) United States Patent
Wu et al.

(10) Patent No.: US 6,526,198 B1
(45) Date of Patent: Feb. 25, 2003

(54) MICROMACHINED OPTOMECHANICAL SWITCHES

(75) Inventors: Ming C. Wu, Pacific Palisades, CA (US); Li Fan, Rowland Heights, CA (US); Anis Husain, San Diego, CA (US)

(73) Assignee: OMM, Inc., San Diego, CA (US)

( * ) Notice: Subject to any disclaimer, the term of this patent is extended or adjusted under 35 U.S.C. 154(b) by 0 days.

(21) Appl. No.: 10/053,399

(22) Filed: Jan. 17, 2002

Related U.S. Application Data

(63) Continuation of application No. 09/063,644, filed on Apr. 20, 1998, now abandoned.

(51) Int. Cl.[7] .................................................. G02B 6/26
(52) U.S. Cl. .............................. 385/18; 385/16; 385/25
(58) Field of Search .............................. 385/18, 15–25, 385/83, 88–94, 147

(56) References Cited

U.S. PATENT DOCUMENTS

| | | |
|---|---|---|
| 3,430,057 A | 2/1969 | Genahr |
| 3,622,792 A | 11/1971 | Piccininni |
| 3,990,780 A | 11/1976 | Dakss |

(List continued on next page.)

FOREIGN PATENT DOCUMENTS

| | | |
|---|---|---|
| DE | 19500214 | 7/1996 |
| EP | 0510629 A1 | 10/1992 |
| EP | 0510629 | 10/1992 |
| EP | 0 880 040 A2 | 11/1998 |
| EP | 0 902 538 A2 | 3/1999 |
| EP | 0902538 | 3/1999 |
| EP | 0 903 607 A2 | 3/1999 |
| EP | 0 921 702 A2 | 6/1999 |
| JP | 01238605 | 9/1989 |
| WO | WO 00/77556 | 12/2000 |

OTHER PUBLICATIONS

"Micromachanical fiber–optic switches for optical networks" Nabelle A Riza (General Electric Corporate Research and Development Center) and Dennis L. Folla (Dept. of Electrical Engineering—University of Minnesota) SPIE vol. 1793 Integrated Optics and Microstructures—1993 (pp. 109–126).

"Electromagnetic MEMS Scanning Mirrors For Holographic Data Storage" Raanan A. Miller, Geoffrey W. Burr, Yu–Chong Tai and Demetri Psaltis (Electrical Engineering—California Institute of Technology) Solid–State Sensor and Actuator Workshop, Hilton Head, South Carolina, Jun. 2–6, 1996 (pp. 183–186).

"Electro–Nanomechanically Activated Integrated–Optical Interferometric Switches" R. Dangel and W. Lukesa (Optic Laboratory—Swiss Federal Institute of Technology) (pp. 482–485), No Date.

"A magnetically actuated MEMS scanning mirror" Raanan A. Miller, Geoffrey W. Burr, Yu–Chong Tai and Demetri Fsaltis (Electrical Engineering—California Institute of Technology) SPIE vol. 2687 (pp. 47–52), No Date.

(List continued on next page.)

*Primary Examiner*—Phan T. H. Palmer
(74) *Attorney, Agent, or Firm*—Arien Ferrell; William Fuess

(57) ABSTRACT

In at least one embodiment, a MEMS optomechanical switch in accordance with the present invention includes a substrate, a signal source capable of transmitting a radiation signal, an electrode coupled to the substrate, and a micromachined plate rotatably coupled to the substrate about a pivot axis. The switch further includes a micromirror having an orientated reflective surface, mounted to the micromachined plate and an electrical source coupled to at least one of the electrode and the micromachined plate.

20 Claims, 6 Drawing Sheets

U.S. PATENT DOCUMENTS

| | | | |
|---|---|---|---|
| 4,208,094 A | 6/1980 | Tomlinson | |
| 4,303,302 A | 12/1981 | Ramsey | |
| 4,317,611 A | 3/1982 | Peterson | |
| 4,626,066 A | 12/1986 | Levinson | |
| 4,630,883 A | 12/1986 | Taylor | |
| 4,740,050 A | 4/1988 | Husain | 350/96.16 |
| 4,762,382 A | 8/1988 | Husain et al. | 350/96.12 |
| 4,850,697 A | 7/1989 | Schennauer et al. | 356/419 |
| 4,932,745 A | 6/1990 | Blonder | |
| 4,989,941 A | 2/1991 | Soref | |
| 5,037,173 A | 8/1991 | Sampsell | |
| 5,042,889 A | 8/1991 | Benzoni | |
| 5,052,777 A | 10/1991 | Ninnis et al. | 385/19 |
| 5,097,229 A | 3/1992 | Forge | 332/115 |
| 5,168,535 A | 12/1992 | Kucherov et al. | 385/16 |
| 5,199,088 A | 3/1993 | Magel | |
| 5,208,880 A | 5/1993 | Riza | |
| 5,255,332 A | 10/1993 | Welch | |
| 5,278,515 A | 1/1994 | Mathews | 330/59 |
| 5,311,410 A | 5/1994 | Hsu et al. | 362/20 |
| 5,317,659 A | 5/1994 | Lee | |
| 5,351,330 A | 9/1994 | Jongewaard | 385/93 |
| 5,375,033 A | 12/1994 | Mac Donald | 361/281 |
| 5,410,371 A | 4/1995 | Lambert | 348/769 |
| 5,420,946 A | 5/1995 | Tsai | |
| 5,436,986 A | 7/1995 | Tsai | |
| 5,444,801 A | 8/1995 | Laughlin | 385/16 |
| 5,522,796 A | 6/1996 | Dorsey, III | 604/118 |
| 5,524,153 A | 6/1996 | Laor | 385/16 |
| 5,555,327 A | 9/1996 | Laughlin | 385/16 |
| 5,572,014 A | 11/1996 | Wu et al. | 250/208.2 |
| 5,621,829 A | 4/1997 | Ford | |
| 5,646,828 A | 7/1997 | Wu et al. | 369/112 |
| 5,651,023 A | 7/1997 | MacKinnon | 372/107 |
| 5,774,604 A | 6/1998 | McDonald | |
| 5,786,925 A | 7/1998 | Goosen et al. | 359/245 |
| 5,835,212 A | 11/1998 | Kissa et al. | 356/345 |
| 5,841,917 A | 11/1998 | Jungerman et al. | 385/17 |
| 5,867,297 A | 2/1999 | Kiang et al. | 359/198 |
| 5,878,177 A | 3/1999 | Karasan et al. | 385/17 |
| 5,903,687 A | 5/1999 | Young | |
| 5,923,798 A | 7/1999 | Aksyuk et al. | 385/19 |
| 5,933,269 A | 8/1999 | Rubinson | 359/280 |
| 5,943,454 A | 8/1999 | Aksyuk et al. | 385/22 |
| 5,945,898 A | 8/1999 | Judy | |
| 5,960,132 A | 9/1999 | Lin | |
| 6,031,946 A | 2/2000 | Bergmann | |
| 6,144,781 A | 11/2000 | Goldstein | |
| 6,160,928 A | 12/2000 | Schroeder | |
| 6,219,472 B1 | 4/2002 | Horino et al. | |

OTHER PUBLICATIONS

"Free–Space Optical Switches with Strictly Nonblocking and Self–Routing Functions" Shigeru Kawai and Hisakazu Kurita (Opto–Electronics Research Laboratories—NEC Res. & Develop., vol. 37, No. 4, Oct. 1996) (pp. 455–466).

"Design of Mirror Structures for Two Dimensional Integrated Optical Crosspoint Switches" M. Owen, M. Asgari (on leave from the school of Physics, University of Bath), I.H. White (Centre for Communications Research, University of Bristol) (p. 119), No Date.

"Recent progress on silica–based optical switches and free–space optical switches" Akira Himeno (NTT Opto–Electronics Laboratories) and Masayasu Yamaguchi (NTT Network Service Systems Laboratories) SPIE vol. 2691 (pp. 72–83), No Date.

"Optical Switches and Modulators—Progress on digital optical switches and switch arrays" W. H. Nelson (GTE Laboratories) OFC '95 Technical Digest (pp. 280–281).

"Free–Space Optical Crossbar–Switches for Self–Routing and Strictly Nonblocking Networks" Shigeru Kawai (Opto–electronics NEC Laboratory) Optical Review vol. 4, No. 3 (1997) (pp. 390–394).

"Fabrication and Operation of Electrostatic Micro Torsion Mirrors for Optical Switches" H. Toshiyoshi and H. Fujita (Institute of Industrial Science—The University of Tokyo) Technical Digest of the $14^{th}$ Sensor Symposium 1996 (pp. 275–278).

"Micromechanic Shutter Fiber–Optic Switch" IBM Technical Disclosure bulletin, vol. 37, No. 28, Feb. 1, 1994 (pp. 457–459).

"Phosphosilicate Glass Waveguides for Phased–Array Radar Time Delay" G.A. Mogel and J.L. Leonard (Central Research Laboratories—Texas Instruments Inc.) SPIE, vol. 1703, Apr. 20, 1992 (pp. 371–378).

"Dynamics of Polysilicon Parallel–Plate Electrostatic Actuators" Patrick B. Chu, Phyllis R. Nelson, Mark L. Tachiki, Kristofer S.J. Pister (Department of Electrical Engineering—University of California at Los Angeles) Sensors and Actuators A, vol. 52, 1996 (pp. 216–220).

"Integrated Devices Make an Optical Bench on a Chip" Ming C. Wu, L.Y. Lin, S.S. Lee and C.R. King Laser Focus World, Feb. 1996 (pp. 64–68).

"Microfabricated Hinges" Pister et al., V. 33 Sensors and Actuators A 1992 (pp. 249–256).

"Application of Micromachinig Technology to Optical Devices and Systems" H. Fujita SPIE, vol. 2879, 1996 (pp. 2–11).

Fortune Magazine—Richard A. Shaffer "The Next Big Switch Will Be Optical" Jun. 23, 1999 (pp. 1–4).

Semiconductor Online—David Bishop, Randy Giles, Vladimir Aksyuk, Keith Goossen, James Walker, and Joseph Ford; Bell Laboratories, Lucent Technologies "Optical Micromachined Devices Serve Multiple Applications" Jan. 27, 1998 (pp. 1–8).

S.S. Lee, L.Y. Lin and M.C. Wu UCLA, Electrical Engineering Dept., LA, CA "Realization of Free–Space Fiber Optic Switches Using The Surface–Micromachining Technology" (pp. 71–72).

S.S. Lee, L.Y. Lin and M.C. Wu "Surface–micromachined free–space fibre–optic switches" Aug. $17^{th}$ 1995 vol. 31 No. 17 Electronic Letters (pp. 1481–1482).

AT&T News Release "For Release Monday, Jan. 7, 1990" (pp. 1–3).

Bahram Jalali "Microware Photonics Research at UCLA" (pp. 1–5 and 4 figures).

Electrical and Optical Engineering "MEMS for Optical Applications" Oct. 28–30 (p. 1).

The Center for Miltidisciplinary Optical Switching Technology—Optical Switch Corporation website materials (pp. 1–6).

University of Delaware—Joe Pepe "Photonic Switching and Multiplexing—CISC659 Telecommunications Systems" May 6, 1998 (pp. 1–14).

S.P. Levitan, T.P. Kurzweg, M.A. Rempel, D.M. Chiarulli—University of Pittsburgh; P.J. Marchand, C. Fan, F.B. McCormick—university of California, San Diego "Computer Aided Design and Simulation of Free Space Optoelectronic Information Processing Systems" (p. 1).

Optical MicroMachines—"Micromachined Optical Switches" (pp. 1–19).

Raanan A. Miller, Yu–Chong Tai, Guoda Xu, John Bartha, and Freddie Lin—Electrical Engineering, MS 136–93, California Institute of Technology "An Electromagnetic MEMS 2 × 2 Fiber Optic Bypass Switch" Jun. 16–19, 1997 (pp. 89–92).

Etsu Hashimoto, Yuji Uenishi, Kazuharu Honma, and Shinji Nagaoka—NTT Opto–electronics Laboratories "Micro–optical gate for fiber optic communication" Jun. 16–19, 1997 (pp. 331–334).

Lin, L.Y., "Micromachined Integrated Optics for Free–Space Interconnections," Proceedings IEEE Micro Electro Mechanical Systems.

Muller, Richard S., "Surface–Micromachined Microoptical Elements and Systems," Proceedings of the IEEE, vol. 86 (No. 8), p. 1705–1720.

Lin, L.Y., "High–Density Micromachined Polygon Optical Crossconnects Exploiting Network Connection–Symmetry," IEEE Photonics Technology Letters, vol. 10 (No. 10).

Pister, K.S.J., "Microfabricated Hinges," Sensors and Actuators, p. 249–256.

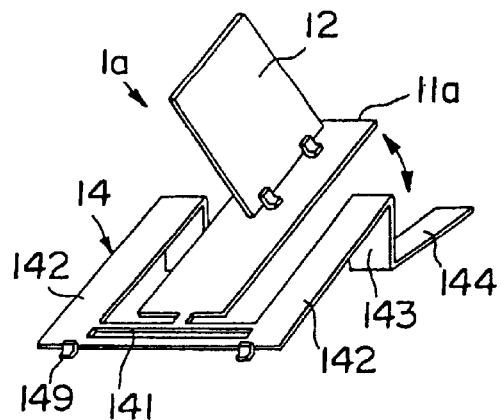
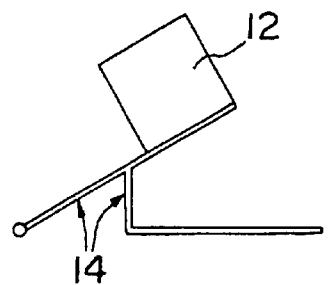
FIG. 3(a)    FIG. 3(b)
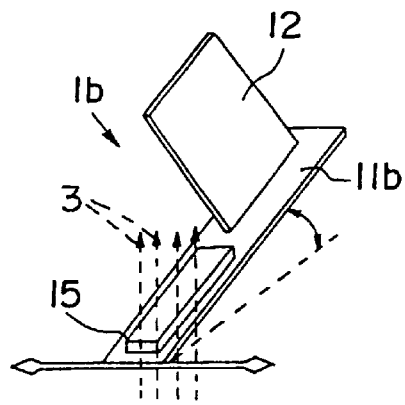
FIG. 4
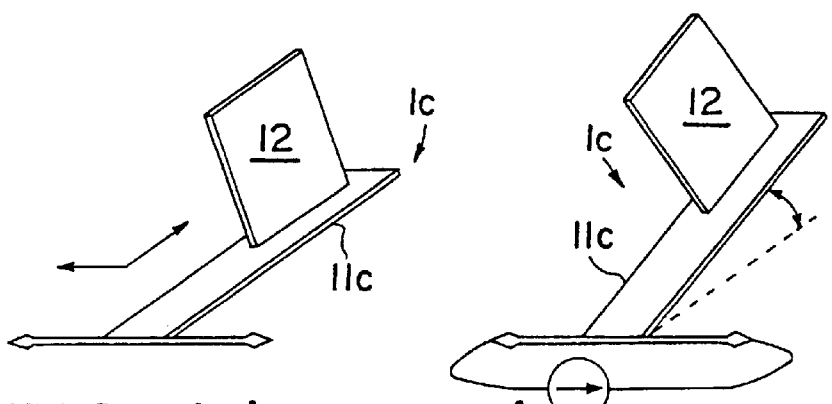
FIG. 5(a)    FIG. 5(b)

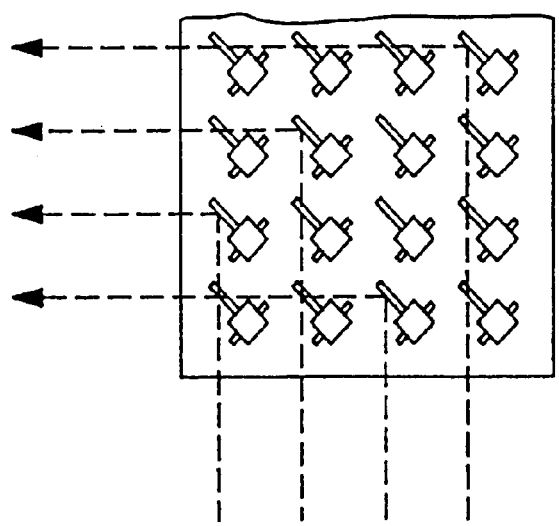
F I G. 12
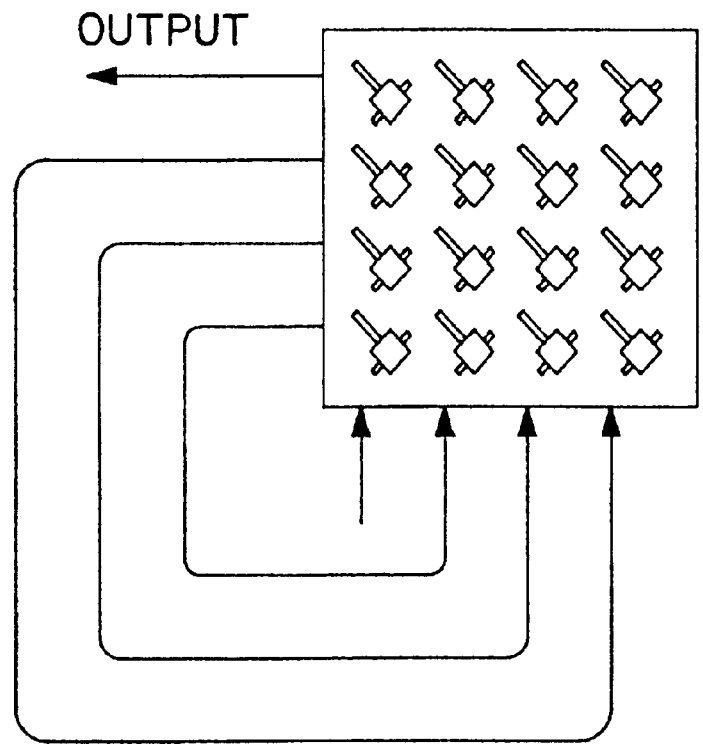
F I G. 13

MICROMACHINED OPTOMECHANICAL SWITCHES

This application is a continuation of U.S. Pat. application Ser. No. 09/063,644, by Ming Wu, Li Fan and Anis Husain, filed on Apr. 20, 1998, entitled MICROMACHINED OPTO-MECHANICAL SWITCHES, now abandoned on Aug. 2, 2002, which is hereby incorporated by reference herein, in its entirety.

BACKGROUND OF THE INVENTION

1. Field of the Invention

The present invention generally concerns optical switches; particularly optomechanical switches; and still more particularly micromachined, or Micro Electro Mechanical Systems (MEMS), optomechanical switches.

The present invention particularly concerns micromachined, or Micro Electro Mechanical Systems (MEMS), optomechanical switches having a MEMS torsion plate—which serves to mount a micromirror—that is (i) electrostatically or electromagnetically moved in angular position, and/or (ii) hinged for angularly pivoting movement by surface micromachined hinges, and/or (iii) mechanically biased in angular privoting movement by torsion springs that also serve to conduct electricity.

2. Description of the Prior Art

2.1 General Prior Art Optical Switching, and Micromachined Optical Switches Optical switching plays a very important role in telecommunication networks, optical instrumentation, and optical signal processing systems. In telecommunication networks, fiber optic switches are used for network restoration, reconfiguration, and dynamic bandwidth allocation.

There are many different types of optical switches. In terms of the switching mechanism, the switches can be divided into two general categories. A first type, called "optomechanical switches", involves physical motion of some optical elements. The second type, which will be referred to here as "electro-optic switches", employs a change of refractive index to perform optical switching. This refractive index change can be induced by electro-optic, thermal-optic, acousto-optic, or free-carrier effects. The electro-optic-type switch generally needs to be implemented in coupled optical waveguides.

Optomechanical switches offer many advantages over electro-optic switches. They have lower insertion loss, lower crosstalk, and higher isolation between ON and OFF state. They are bidirectional and independent of optical wavelength, polarization, and data modulation format. The crosstalk of electro-optic waveguide switches is limited to a range above −30 dB, and is often in the range of −10 to −15 dB, while optomechanical switches can routinely achieve crosstalk <−50 dB.

An optomechanical switch can be implemented either in free-space or in waveguides (or in fibers). The free-space approach is more scalable, and offers lower coupling loss to optical fibers. Currently, macro-scale optomechanical switches employing external actuators are available commercially. For example, conventional optomechanical switches are available from JDS, DiCon, AMP, HP, etc. Most, of these switches are, however, bulky and require extensive manual assembly. Their speed is also slow, the switching time ranging from 10 milliseconds to several hundred milliseconds. Worse, the switching time often depends on the switching path, i.e., how far is the next output port from the current output port. This is very undesirable for system design. Response times below 1 millisecond are desirable for network applications.

Meanwhile, micromachining technology, also known as Micro Electro Mechanical Systems (MEMS), offers many advantages for building optomechanical switches. MEMS technology is a batch processing technique for fabricating movable microstructures and microactuators. See, for example, K. E. Petersen, "Silicon as a Mechanical Material", Proc. IEEE 70 (1982) 420–457; and M. F. Dautartas, A. M. Benzoni, Y. C. Chen, G. E. Blonder, B. H. Johnson, C. R. Paola, E. Rice, and Y. H. Wong, "A Silicon-Based Moving Mirror Optical Switch" J. Lightwave Technol. 8 (1992) 1078–1085.

Micromachining technology, or MEMS, can significantly reduce the size, weight, and cost of optomechanical switches. The switching time can also be reduced because of the higher resonant frequency of the smaller optomechanical switches. Furthermore, the MEMS optomechanical switch is more rugged than macro-scale switches of equivalent design because the inertial forces are much smaller in the micro-scale switches. MEMS technology has previously been employed to realize various types of optomechanical switches.

2.1 Specific Prior Art Micromachined Optical Switches—Free-Space Optomechanical Switches There has been some demonstration of MEMS fiber optic switches. Both bulk-micromachining and surface-micromachining techniques have been employed. However, none of the reported switches fully satisfy all the requirements for large scale network applications. The bulk micromachined 2×2 fiber optic switch was reported by AT&T Bell Labs in 1992. See M. F. Dautartas, A. M. Benzoni, Y. C. Chen, G. E. Blonder, B. H. Johnson, C. R. Paola, E. Rice, and Y. H. Wong, "A Silicon-Based Moving Mirror Optical Switch," in J. Lightwave Technol, 8 (1992) 1078–1085. The Bell Labs switch employs two separate silicon wafers (vertical micromirrors in the top <110> silicon wafer, and V-grooves grooves in bottom <100> silicon substrate). The two wafers are joined together manually and external actuators are employed. An insertion loss of 0.7 dB and a switching time less than 10 ms have been obtained. This switch, however, still requires substantial manual assembly and the cost is very high. It does not appear to be scalable to large arrays.

Toshiyoshi and Fujita of the University of Tokyo reported a 2×2 matrix switch using bulk micromachined torsion mirrors. See Toshiyoshi, H.; Fujita, H. "Electrostatic micro torsion mirrors for an optical switch matrix," J. Microelectromechanical Systems, vol. 5 , p. 231–7, 1996. Torsion mirrors are suspended by thin polysilicon beams over through holes etched on silicon substrate. The mirror substrate is then bonded to another silicon substrate, on which bias electrodes and mechanical stops are patterned and etched. When the mirror is attracted downward by the electrostatic force, light is reflected to the orthogonal output fibers. Large switching contrast (>60 dB), small crosstalk (<60 dB), and a fairly high insertion loss of 7.6 dB were reported. One limitation of this approach is that the mirror angle in the ON state is determined by the mechanical stop on another wafer and cannot be accurately controlled or reproduced. This results in the high insertion loss reported in their paper.

Marxer et al., from University of Neuchatel reported a bulk micromachined 2×2 fiber optic switches using deep reactive ion etching (DRIE) process on silicon-on-insulator (SOI) wafer. See C. Marxer, M.-A. Gretillat, N. F. de Rooij, R. Battig, 0. Anthamatten, B. Valk, and P. Vogel, "Vertical Mirrors Fabricated by Reactive Ion Etching for Fiber Optical Switching Applications," in Proc. 10$^{th}$ Workshop on Micro Electro Mechanical Systems (MEMS), pp. 49–54, 1997. The 75-µm-thick silicon layer above $SiO_2$ is etched through by DRIE. A 2.3-µm-thick vertical mirror as well as the electrostatic microactuator are created by the same etching step. Switching time below 0.2 ms, coupling loss of 2.5 dB and 4 dB, and switching voltage of 28 V have been achieved. A similar process has recently been reported by the Michigan group. See W. H. Juan and S. W. Pang, "Batch-Micromachined, High Aspect Ratio Si Mirror Arrays for Optical Switching Applications," in Proc. International Conf. Solid-State Sensors and Actuators (TRANSDUCERS 97), Paper 1A4. 09P, 1997.

There are two limitations of this approach: (1) the mirror angle and quality are determined by the etching process. Mirror angle <1° is difficult to achieve. The rough etched surface also introduces scattering losses. It is also difficult to polish the sidewalls or coat metals on the mirrors. (2) The displacement of the mirror is small because the comb drive actuator has limited displacement. In Marxer's paper, tapered fibers were placed very closed to the mirror (<20 µm), which reduces the required mirror movement. However, such configuration is not scalable to switches with dimension larger than 2×2 arrays. Michigan's group did not report the optical characterization data of their switch.

Miller and Tai of Caltech reported an electromagnetically actuated 2×2 fiber optic switches. See R. A. Miller, Y. C. Tai, G. Xu, J. Bartha, and F. Lin, "An Electromagnetic MEMS 2×2 Fiber Optic Bypass Switch," in Proc. International Conf. on Solid-State Sensors and Actuators (TRANSDUCERS 97), pp. 89–92, 1997. The 5-µm-thick micromirror is fabricated by anisotropic (TMAH) etching on <011> silicon substrate. The mirror is then glued a suspended silicon membrane. The silicon membrane is bulk micromachined, and connected to the silicon substrate by cantilevers or torsion beams. It is actuated electromagnetically through the interaction of an integrated copper coil and an external magnet. A switching time of 10 ms, an insertion loss of 3 dB, and switching current of 20–30 mA have been achieved. There are several limitations for this approach: first, the electromagnetic coil has large fringe field and, therefore, high crosstalk among adjacent switching elements. It is difficult to make dense switch arrays. Second, the power consumption for each switch is very high. Heat sinking will be a major issue for large arrays. Third, constant power consumption is required. Forth, the mirror integration process is not a manufacturable process.

In 1995, UCLA reported a surface-micromachined 2×2 fiber optic switch. See S. S. Lee, L. Y. Lin, and M. C. Wu, "Surface-Micromachined Free-Space Fiber Optic Switches," Electronics Letters, Vol. 31, No. 17, pp. 1481–1482, August 1995. Surface micromachining offers greater flexibility since it can monolithically integrate various types of three-dimensional micro-optical elements and microactuators. See M. C. Wu, L. Y. Lin, S. S. Lee, and K. S. J. Pister, "Micromachined Free-Space Integrated Micro-Optics," in Sensors and Actuators: A. Physical, Vol. 50, pp. 127–134, 1995.

The UCLA switch is made of a surface-micromachined moveable micromirror. The vertical micromirror was realized by the microhinge technology. See K. S. J. Pister, M. W. Judy, S. R. Burgett, and R. S. Fearing, "Microfabricated Hinges, Sensors and Actuators: A. Physical, Vol. 33, pp. 249–255, 1992. This vertical micromirror was integrated on a surface-micromachined translation stage. Because stepper motor (scratch drive actuator) is employed, and large travel distance is needed, the switching time is inherently long (15 msec). See S. S. Lee, E. Motamedi, and M. C. Wu, "Surface-Micromachined Free Space Fiber Optic Switches with Integrated Microactuators for Optical Fiber Communication Systems," in Proc. 1997 International Conferences on Solid-State Sensors and Actuators Transducers 97, Paper 1A4.07P, 1997. This switch also suffers from very poor reliability due to friction and tear/wear (similar to that of the original micromotors). See L. S. Fan, Y. C. Tai, and R. S. Muller, "Integrated Movable Micromechanical Structures for Sensors and Actuators," in IEEE Trans. Electron. Device, Vol. 35, pp. 724–730, 19E8.

The torsion mirrors such as the Digital Micromirror Devices (DMD) (sometimes "Deformable Mirror Device) and their variations developed by Texas Instruments can also be employed as an optical switch. See, as an early patent on a DMD, U.S. Pat. No. 4,441,791 to Hornbeck for a DEFORMABLE MIRROR LIGHT MODULATOR and assigned to Texas Instruments Incorporated (Dallas, Tex.). The Hornbeck DMD concerns a light modulator where a light-reflective metallized membrane defining a deformable mirror is disposed over a semiconductor substrate in which a matrix array of field effect address transistors are formed.

The modern form of the DMD is basically a torsion mirror with ±10° tilting angles. Two types of optical switches have been realized by DMD-like devices: the first type employs the DMD as tilting mirrors. Light from input fiber is directed to different output fibers by the DMD. This switch is limited to 1×2 arrays and is very difficult to scale up to larger switches. Packaging is also very difficult since the optical fibers are not in the same plane as the switches. The second type uses the DMD as an ON-OFF switch. For this application, the asymmetric DMD, i.e., the torsion plate with a very long arm, is often employed. To construct a N×N switch, each fiber is split into N such ON-OFF switches, and the output to the same fiber is then combined from N switches again. This switch is fundamentally lossy. The fundamental splitting loss is 2 log N, or 18 dB for an 8×8 switch, which is unacceptable for system application without employing optical amplifiers.

Another ON/OFF switch, called in-line fiber gate, was demonstrated by the NTT group. See E. Hashimoto, Y. Uenishi, K. Honma, and S. Nagaoka, "Micro-Optical Gate for Fiber Optic Communications," in Proc. International Conf. on Solid-State Sensors and Actuators (TRANSDUCERS 97), pp. 331–334, 1997. Hashimoto, et al. employ the electrostatic torsion beam actuator similar to the Digital Micromirror Device (DMD) of Texas Instruments, Inc, (Dallas, Tex.). Instead of using the torsion plate as mirror, another vertical metal mirror is integrated on the torsion plate by electroplating. The height of the micromirror is about 20 µm, and the precise angle of the micromirror is hard to control (an accuracy of 0.5° requires an aspect ratio of 115, while most thick photoresist mold's aspect ratio is less than 20). The displacement of the torsion plate is also very small due to the thin sacrificial layer used. The displacement requirement is relaxed by employing lensed optical fibers, which reduce the optical beam diameter to 2 µm. However, they are not suitable for large switches. The ON/OFF switch is also undesirable for constructing N×M switches.

2.3 Specific Prior Art Micromachined Optical Switches—Waveguide/Fiber-Based Optomechanical Switches Ollier and Mottier reported a 1×2 waveguide optical switch. See Ollier, E., Mottier, P., "Integrated electrostatic micro-switch for optical fibre networks driven by low voltage," Electronics Letters, vol. 32, p. 2007–9, 1996. The device consists of a movable waveguide and two fixed waveguides. The movable waveguide is basically a silica cantilever beam realized by undercutting the silicon below the waveguide. The motion is constrained to the in-plane direction by two flexure beams. The movable waveguide can be pulled towards either fixed waveguides by electrostatic gap-closing actuators. A fiber-to-fiber insertion loss of 3–4 dB, a switching time of 0.8 ms, and a driving voltage of ±28 V has been obtained. Another type of fiber optic switch involves physical movement of the fiber itself instead of waveguide Field, et al. of HP reported a 1×2 fiber optic switch which utilize a electroplated (LIGA) thermal actuator to move the input fiber between two output fibers. See L. A. Field, D. L. Burriesci, P. R. Robrish, and R. C. Ruby, "Micromachined 1*2 optical-fiber switch," Sensors and Actuators A (Physical), Vol. A53, pp. 311–16, 1996. A coupling loss of −5.8 dB and isolation of 66.5 dB have been achieved. Another moving-fiber optical switch is reported by Gonzales and Collins. See C. Gonzalez and S. D. Collins, "Magnetically actuated fiber-optic switch with micromachined positioning stages," Optics Letters, Vol. 22, pp. 709–11, 1997. The 1×4 switch consists of one movable fiber and four fixed fibers. The movable fiber is mounted on a bulk-micromachined and manually assembled translation stage, which is actuated by an electromagnetic actuator. A thin film of paramagnetic material (permalloy) is deposited on the input translation stage and an external magnetic field is applied to either side of the sliding stage to align the input fiber to the appropriate output fiber. A switching time of 5 msec, an insertion of 1 dB, and a crosstalk of −60 dB have been achieved for multimode fibers. One of the major constraints of the waveguide-based fiber optic switches is that they are mainly constrained to 1×N switches, and it is very difficult to scale up to N×M switches. The waveguide-type switches also have high fiber-to-fiber insertion loss.

2.4 Background Regarding the Alignment(s) of Free Space Optomechanical Switches

The present invention will be seen to facilitate, and improve, precise optical alignments in free space, and through micromechanical optomechanical switches. A patent discussing the requirements of optical alignment in optical switching is U.S. Pat. No. 5,155,778 to Magel, et. al. for an OPTICAL SWITCH USING SPATIAL LIGHT MODULATORS (assigned to Texas Instruments Incorporated, Dallas, Tex.). This patent concerns a structure for optical interconnection. In one embodiment, the structure consists of optical fibers connected to an array of microlenses, either through integrated waveguides or not, that direct light onto a mirror formed in a substrate, which mirror reflects light to a spatial light modulator. The spatial light modulator in turn reflects the light back to another mirror, which reflects the light through another microlens array, through integrated waveguides or not, and out another optical fiber. The structure is manufactured by forming the mirrors out of the substrate, forming waveguides if desired, forming troughs for the fibers and the microlenses, attaching external pieces such as the fibers, the lenses, and the spatial light modulator package, and packaging the device to maintain alignment.

2.5 Background Regarding the Tilt Angle of Free Space Optomechanical Switches

The performance of DMD-devices is also of interest. The devices of the present invention do not directly have a "tilt angle" though which light is reflected, but will be seen to have the ability to selective (i) transmit, or (ii) reflect, incipient light beam, for an effective "tilt, angle" of 180°. It is, however, illustrative to understand how important a large (180° is maximum) and regularly repeatable "tilt angle" is in free-space optical switching. Such an understanding can be gained from U.S. Pat. No. 5,548,443 to Huang for a LIGHT SEPARATOR FOR TESTING DMD PERFORMANCE assigned to Texas Instruments Incorporated (Dallas, Tex.). The Huang light separator tests the tilt angles of mirror elements of a digital micro-mirror device. The light separator is comprised of two triangular prisms. A bottom prism receives light from all mirror elements. It transmits light from all mirror elements having a tilt angle over a specified angle from a different face than light from mirror elements having a tilt angle less than the specified angle. A top prism receives light from one face of the bottom prism. It further divides the light, so that light from all mirror elements having a tilt angle within a specified range is transmitted from one face and light from other mirror elements is transmitted from another face.

2.6 Background Regarding the Sticking, Adherence, or "Stiction" of the Moving Elements of Optomechanical Switches The present invention will shortly be seen to offer improvement regarding the sticking, or adherence, or "stiction" of the moving element(s) of an optomechanical switches.

A previous attempt to improve operability in this area is shown in U.S. Pat. No. 5,579,151 to Cho for a SPATIAL LIGHT MODULATOR assigned to Texas Instruments Incorporated (Dallas, Tex.). The Cho Spatial Light Modulator, or SLM, has a reflector that is electrostatically deflectable out of a normal position, where a supporting beam is unstressed, into a deflected position, where a portion of the mirror contacts a portion of a landing electrode which is at the same electrical potential as is the reflector. An inorganic layer or solid lubricant is deposited on the contacting portions. After the modulator is operated for a period of time, the tendency of the reflector to stick or adhere to the landing electrode is diminished or eliminated by the layer so that the reflector is returned to its normal position without any reset signal or with a reset signal having a reasonably low value. Preferred materials for the layer are SiC, AlN or SiO(2).

Yet another previous effort to deal with this problem is shown in U.S. Pat. No. 5,665,997 to Weaver, et. al. for a GRATED LANDING AREA TO ELIMINATE STICKING OF MICROMECHANICAL DEVICES assigned to Texas Instruments Incorporated (Dallas, Tex.). The Weaver digital micro-mirror device (DMD) has contacting elements that are reportedly not prone to stick together. In the case of a deflecting mirror device, landing electrodes are covered with a grating, which serves to reduce the contacting area but still permits conduction between the mirror and a landing electrode. Alternatively, the landing electrode can be fabricated as a grated surface.

2.7 Background Regarding Optomechanical Hinges, as May be Used in Optomechanical Switches The optomechanical switch of the present invention will shortly be seen to preferably incorporate a micromechanical hinge of improved form. A general reference to the state of the art in these micromechanical structures is given in K. S. J. Pister, M. W, Judy, S. R. Burgett, and R. S. Fearing, "Microfabricated Hinges, Sensors and Actuators: A. Physical, Vol. 33, pp. 249–255, 1992.

Another reference is U.S. Pat. No. 5,600,383 to Hornbeck for a MULTI-LEVEL DEFORMABLE MIRROR DEVICE WITH TORSION HINGES PLACED IN A LAYER DIFFERENT FROM THE TORSION BEAM LAYER assigned to Texas Instruments Incorporated (Dallas, Tex.) The Hornbeck multi-level DMD (where here the initials "DMD" have their alternative meaning of "deformable mirror device") concerns a bistable pixel architecture where torsion hinges are placed in a layer different from the torsion beam layer. This results in pixels which can be scaled to smaller dimensions while at the same time maintaining a large fractional active area, an important consideration for bright, high-density displays such as are used in high-definition television applications.

SUMMARY OF THE INVENTION

The present invention contemplates micromachined, or Micro Electro Mechanical Systems (MEMS), optomechanical switches of new design having certain advantages over existing MEMS optomechanical switches. These advantages include, inter alia, (i) increasing the speed, certainty and exactitude of (micro-) movement (which movement is, among other things, useful for the optical switching of a light beam), while (ii) reducing stiction, of sticking, of the components of the optomechanical switch.

The invention realizes these advantages through certain unique structures that are usable both in the preferred micromechanical optomechanical switches of the present invention and also in other MEMS switches and devices. These structures include (i) geometries of (micromachined) electrode plates and/or electrical coils which serve to develop electrostatic and/or electromagnetic forces so as to move a (micromechanical) switch element in (angular, pivoting) position, (ii) surface micromachined hinges which permit (micromachined) plate to be accurately angularly pivoted in a predetermined plane, (iii) (micromechanical) torsion springs that both mechanically bias the (micromachined micro-hinged) plate in its angular pivoting movement and that also serve to conduct electricity to the (micromachined angularly pivoting microhinged) plate, and (iv) a structure micromachined upon a substrate for both mechanically receiving, and for making electrical connection to, a distal end region of micromachined plate that is controllably pivoting about the substrate from its proximal end region so as to selectively land upon the structure, thus "a micromachined landing electrode structure".

1. A micromachined Optomechnical Switch 1.1 Hinged for Pivoting Operation Under Electrical Force In one of its aspects the present invention is embodied in a micromachined optomechanical switch having (i) a micromirror that is mounted to (ii) a micromachined plate (sometimes called a "torsion plate") that is itself mechanically hinged about a pivot axis to (iii) a substrate. The switch is activated by a circuit selectively develops (i) an electrostatic or (ii) an electromagnetic force between the micromachined plate and the substrate, either of which (i) electrostatic or (ii) electromagnetic force causes the micromachined plate and the micromirror mounted thereto to pivot in angular position relative to the substrate.

By this pivoting operation a radiation beam will selectively intercept the micromirror dependent upon whether the micromachined plate is, or is not, moved in angular position by action of the electrostatic, or the electromagnetic, force that is selectively developed by the circuit between the micromachined plate and the substrate. Ergo, an electrically-controlled optomechanical switch is realized.

Note that the (i) micromirror is not the same as the (ii) pivoting micromachined plate. Indeed, the micromirror is preferably mounted (i) perpendicularly to the micromachined plate, and (ii) orthogonally to the pivot axis of the (pivoting) micromachined plate. By this orientation, and by this relationship, the micromirror will constantly move in the same plane during all angularly pivoting movement of the micromachined plate. This "same-plane" operation is very useful both (i) to selectively direct an incident radiation beam that skims over the top of the substrate, (and that is typically at 45° to the plane of the micromirror) in useful directions, and (ii) to maintain precision optical alignment.

1.2 Hinged for Pivoting Operation Under Electrostatic Force

In greater detail, one, preferred, embodiment of the micromachined optomechanical switch employ electrostatic force as its reliable, strong, and readily-realized actuation mechanism. It is possible to generate either (i) a repulsive electromagnetic force, or (ii) an attractive electromagnetic force, between the micromachined plate and the substrate by the simple expedient of placing an electrostatic charge on both the micromachined plate and the substrate that is, respectively, (i) of the same polarity, or (ii) of differing polarity.

In actual implementation, the generation of a repulsive electrostatic force requires placement of a same-polarity electrical charge on two conductors one or which is electrically floating, and this is more difficult to realize than is the placement of an opposite-polarity electrical charge on each conductor. Therefor the preferred MEMS devices of the present invention, as do the majority of electrostatic MEMS devices, mainly use an attractive electrostatic force, which attractive electrostatic force can readily be easily realized by applying a voltage between two conductors, in this case the (i) micromachined plate and (ii) the substrate.

In developing either the attractive or the repulsive type of electrostatic force, at least one of the micromachined plate and substrate is electrically conducting. Normally the micromachined plate is so conducting. The mechanism for selectively developing an electromagnetic force between the micromachined plate and the substrate requires selectively emplacing, and removing, an electrostatic charge. The electrostatic force developed in response to the electrostatic charge (or, more simply, an "electrical voltage") operates so as to attract (alternatively, so as to repel) the micromachined plate from the substrate, causing it to pivot in angular position about a hinged pivot axis towards (alternatively, away from) the substrate.

An electrical insulator is positioned between (i) the substrate and (ii) the micromachined plate that is hinged to, and that pivots upon, the substrate. An electrical voltage selectively developed between, as a first electrode, (i) the substrate, and, as a second electrode, the (ii) micromachined plate, produces an electrostatic force that serves to pivot the micromachined plate and the micromirror mounted thereon relative to the substrate.

1.3 Hinged for Pivoting Operation Under Electromagnetic Force

Another, less preferred, embodiment of the micromachined optomechanical switch uses electromagnetic force as the actuation mechanism. In this case an electromagnet is positioned in one of (i) the substrate and (ii) the micromachined plate (that is hinged to, and that pivots upon, the substrate), while, typically, permanent magnet is placed in the remaining one of (i) the substrate and (ii) the micromachined plate. (It is possible to use an electromagnet in both (i) the substrate and (ii) the micromachined plate.)

Selectively energizing the electromagnet produces an electromagnetic force that serves, dependent upon the magnetic polarization, either to attract, or to repel, the permanent magnet, thus (in either case) pivoting the micromachined plate and the micromirror mounted thereon relative to the substrate.

In accordance with the principles of a common solenoid that a it is more effective to produce a repulsive electromagnetic force than an attractive electromagnetic force between an electromagnet and a permanent magnet that is appropriately aligned to the field of the electromagnet, in the preferred micromachined optical switches of the present invention the magnetic field of the permanent magnet is positioned and oriented relative to the electromagnet so that energization (at a predetermined direction of current flow) of the electromagnet serves to repel the permanent magnet. Note that, being repulsive in nature, the preferred electromagnetic force is opposite to the preferred electrostatic force, which is attractive in nature.

In fact, the numerous preferred embodiments of micromachined optomechanical switches in accordance with the present invention can be made so as to employ either an attractive or a repulsive force (or both, in certain switch embodiments) of either an electrostatic and/or an electromagnetic nature. Although certain force directions and force types are preferred for ease of implementation, a practitioner of the electrical arts will realize that all the various variations of construction are essentially equivalent.

Indeed, embodiments of the micromachined optomechanical switches in accordance with the present invention which use both attractive and repulsive forces at the same time, or at separate times, are eminently possible. If the attractive force is considered to be a "pull", and the repulsive force to be a "push", then the term "push-pull" is defined as "push OR pull", or those very "single electrical action" switches just discussed. However, the term "push & pull" is reserved for switches that electrically both push AND pull. It is possible to construct a "push & pull" switch having both attractive and repulsive forces (i) exerted in separate areas of the same switch at the same time, or (ii) exerted in the same or in separate areas of the same switch at separate times.

If both the "push & pull" forces are exercised concurrently, then the switch will generally be very "strong" and very "fast" to assume at least a desired forced position. Conversely, if the "push & pull" forces are exerted in a time sequence, then the switch will clearly exhibit a positively-controlled action, assuming first one and then the other position each under a applied electrical force. Likewise, it is possible to build a hybrid "push & pull" switch that combines, for example, electrostatic pull and electromagnetic push; again at the same time, or at separate times.

Continuing with the basic electromagnetic embodiment of the micromachined optomechanical switch, the electromagnet is preferably located in the substrate, thus making that the permanent magnet is located in the micromachined plate, for reason of ease of fabrication. However, the opposite positions are possible. The permanent magnet is preferably made from a magnetic material integrated within the micromachined plate, and is more preferably made of permalloy. The electromagnet is normally a simple loop of conductor, such as may be made from the traces upon a printed circuit substrate.

1.4 With the Pivoting Element Biased in Position to Reduce Stiction

Variants of both embodiments of the micromachined optomechanical switch permit (i) minimization of stiction, of the undesirable sticking of the micromechanical pivoting plate to the substrate, and (ii) maximization of the spatial movement of the mirror.

For example, in the magnetic embodiment just discussed, the permanent magnet in the micromachined plate can serve to bias the micromachined plate in position off the substrate. This bias will exist regardless that the electrostatic or the electromagnetic force that serves to repel (or to attract) the micromachined plate, and that causes it to pivot away from the substrate, may be absent. The positional biasing of the micromachined plate from off the substrate diminishes the possibility of stiction of the micromachined plate to the substrate.

This positional biasing is typically realized mechanically. In one embodiment of the micromachined optomechanical switch a three-dimensional surface-micromachined structure serves to physically support the micromachined plate in a position angled about the pivot axis and displaced off the substrate. Again, the biasing the pivoting micromachined plate in position off the substrate serves to diminish the possibility that the micromachined plate will fail in its pivoting motion by undesirably adhering to the substrate.

1.5 Push-pull, and Push & Pull, Switches

In another, embodiment, the micromachined plate is bent about an axis, and pivots about the substrate along this axis. As a consequence of this bend, only a portion of the micromachined plate that is upon a one side of the axis will (or can) be against the substrate at any one time, while the portion of the micromachined plate that is upon the other side of the axis will be angled away from the substrate.

The micromirror is mounted to only one bent arm portion of the micromachined plate. The bent micromachined plate serves like a rocker, alternately lifting and lowering the micromirror from the substrate.

Typically one (only) arm portion of the bent micromachined plate is biased in position by a torsion spring. The restoring force of this torsion spring is compounded by an electromagnetic or electrostatic force. This switch is called a "push-pull" switch where it is remembered that this term means to electrically push (i.e., repulse) OR pull (i.e., attract). Clearly then the other push, or pull, force is provided by the spring.

However, it is. also possible to construct, as a variant of the pivoting micromachined plate "push-pull" switch, a "push & pull" switch. This "push & pull" micromachined optomechanical switch permits that all movement of the rocker plate within the switch transpires under positive electrical control. This occurs because the electrical circuit for selectively developing a force selectively so develops a force that alternately repels each portion of the micromachined plate. These forces can be sequenced so as to positively force the micromachined plate to pivot in position: first so as to "push-the-first-portion" followed by "push-the-second-portion". A rocking motion of the switch is thus induced in a "push & push" operation.

Alternatively, the forces between the substrate and each portion of the bent micromachined plate may be temporally sequenced so as to positively force the micromachined plate to pivot in position first in a "push-the-first-portion while pulling-the-second-portion" operation, followed by a "pull-the first-portion while pushing-the-second-portion" operation, or a "push & pull" operation. Clearly the "rocking" bent micromachined plate, and the micromirror mounted thereto, are not only controlled in position, but may be made to strongly and quickly assume any desired position.

These variants are quite useful. An optical switching system designer will normally use a micromechanical "rocker switch" that has the desired response time in each direction of its motion.

1.6 Even More Substantially Three-dimensional Pivoting Switches

Certain other three-dimensional structures are equally, or even more, efficacious for strong, fast, positive switch control.

In one three-dimensional embodiment a micromachined structure serves to elevate the micromachined plate above the substrate, and about a pivot axis that is intermediary in position within the micromachined plate between a first portion and a second portion thereof. (Normally but one micromirror is, as before, mounted to but one portion of the micromachined plate.)

The mechanism for selectively developing a force between the micromachined plate and the substrate so develops the force first between the substrate and one portion of the micromachined plate, and then between the substrate and the other portion. This causes the micromachined plate and the micromirror mounted thereto to pivot in angular position relative to the substrate (as before), only now about the elevated pivot axis.

In accordance with (i) the principle of a lever, and in accordance with the fact that (ii) the micromachined plate may be greatly pivoted in angle in its position elevated above the substrate, the micromirror may be greatly moved in position. In other words, small, or micro, machines can be made to reliably positively produce (relatively) large and useful motions! The (micro) force produced at the long end of the pivoting lever is, of course, minuscule. Luckily, it does not take any great force to reflect light in a mirror, nor to block the transmission of light by a opaque filter!

Normally when (micro) forces are minuscule, stiction can be a problem. Certain other structures within micromachined optomechanical switches in accordance with the present invention serve to minimize, or even eliminate, this problem.

2. A Micromachined Landing Electrode Structure

In accordance with another of its aspects, the present invention is embodied in a micromachined landing electrode structure. This is a structure micromachined upon a substrate for (i) mechanically receiving, and (ii) making electrical connection to, a distal end region of micromachined plate that is pivoting about the substrate at its proximal end region so as to—among such other things as were, for example, discussed above—selectively land upon this structure (which is upon the substrate). The structure is thus called a "micromachined landing electrode structure".

This micromachined landing electrode structure is made from an electrically conductive buckled beam that is buckled above a plane of the substrate in a location that falls under the distal end region of the pivoting micromachined plate. The buckled beam serves (i) as a spring to the pivoting movement of the micromachined plate (at least when it draws near to the substrate), (ii) as an electrode for making electrical contact to the micromachined plate when the micromachined plate is pivoted into (pressured) contact therewith, and (iii) as a stop helping to prevent stiction between the pivoting micromachined plate and the substrate.

The electrically conductive buckled beam is itself preferably formed as polysilicon beam that is pushed until it buckles, and that is then locked in its buckled position into a micromachined structure.

The micromachined plate is normally biased in its angular position by a torsion spring and/or by an electrostatic or an electromagnetic force. When the micromachined plate is in full contact with the substrate, then the contact area is large and the stiction force between micromachined plate and the substrate could also be large. If this stiction force proved to be larger than the restoring force of a torsion spring serving to bias the pivoting micromachined plate in position, then the micromachined plate could become permanently undesirably stuck to the substrate. To combat stiction force, the contact area is reduced by employing the buckled beam, which reduces the contact area to basically a point. Additionally, the larger spring constant of the buckled beam can make the total restoring force larger than any residual sticking force, therefore further reducing the possibility of stiction.

The micromachined plate is normally biased in its angular position by a torsion spring. The spring constant of the buckled beam is made to be much larger than that of the torsion spring so that a force on the micromachined plate by the buckled beam (when the micromachined plate is in contact therewith) will be much stronger than an opposite force on the micromachined plate arising from the torsion spring. The anti-stiction restoring force may alternatively be realized by a cantilever bending spring that is cantilevered from the approximate center of the buckled beam so as to contact the micromachined plate when its pivots close to the substrate. Both bucked beam and/or cantilevered spring provide a spring force that serves to angularly kick the torsion plate off the substrate when any (electrostatic or electromagnetic) force holding it proximately to the substrate is released. This effect promotes fast mechanical action of the micromachined plate, and of the micromachined optomechanical switch of which the micromachined plate forms a part.

3. Improved Micromachined Hinges

In still yet another of its aspects, the present invention is embodied in hinges for a micromachined plate that is angularly hinged for pivoting upon and relative to a substrate.

The hinged pivoting micromachined plate mechanism includes (i) a micromachined plate having at least one substantially straight side adjacent to which straight side is relieved at least one hole. Only a narrow strip of the plate remains between this at least one hole and the edge of the straight side.

The mechanism further includes (ii) so many micromachined staples as there are holes are attached to the substrate. Each staple spans over the narrow strip of the micromachined plate and into a hole so that both ends of the staple can be permanently connected to the substrate. The mechanism thus formed holds the micromachined plate to angularly pivot about the substrate on its narrow strip, which serves as a hinge pin, and along its straight side.

Although these structural elements (i) and (ii) taken alone may well be different from previous micromachined structures, it should be recalled that, in accordance with the principles of the present invention, this pivoting, hinged, micromachined plate must also be both (i) supplied with electrical voltage (at least in the electrostatic embodiments of the switch) and (ii) mechanically biased in position (at least for those switch embodiments that are not "push & pull"). The preferred hinged pivoting micromachined plate mechanism does so permit (i) the micromachined plate to angularly pivot on its straight side about the substrate while (ii) an electrical bias is separately provided to the micromachined plate.

This dual function is accomplished by the final structural element of (iii) one or more torsion springs each of which are attached between the substrate and a region along the straight side pivoting end of the micromachined plate. This (these) torsion spring(s) serves to mechanically bias the micromachined plate in angular position towards the substrate, and into but an acute angular separation therefrom. The angular displacement of the micromachined plate, as it pivots on its hinge pin, is normally limited by these one or more torsion springs.

The combination of (i) the straight-edged holed micromachined plate, (ii) the staples spanning such narrow portion of the micromachined plate as serves as the hinge pin, thus constraining the micromachined plate to pivot upon its straight edge, and (iii) the one or more torsion springs, combine to establish a well-defined axis and direction of angular rotation to the pivoting micromachined plate. In other words, the micromachined plate is exactingly positioned, and rotates exactingly—properties which are useful for the precision deflection of light.

Moreover, the same (iii) one or more torsion springs also serve to conduct electricity between an appropriate electrical trace upon the substrate and, again, the same straight-side pivoting-end region of (i) the micromachined plate. Selective electrical energization proceeding along this conductive path is, or course, exactly how the hinged micromachined plate (and any micromirror attached thereto) is caused to variably selectively pivot in angular position relative to the substrate.

These and other aspects and attributes of the present invention will become increasingly clear upon reference to the following drawings and accompanying specification.

BRIEF DESCRIPTION OF THE DRAWINGS

FIG. 2, consisting of FIG. 2(a) and FIG. 2(b), is a diagrammatic view of the optical switching mechanism realized by first embodiment of a micromachined optomechanical switch in accordance with the present invention; FIG. 2(a) showing a cross-sectional view of the switch in its reflection state while

FIG. 3(a) is a perspective view of a second embodiment of a micromachined optomechanical switch in accordance with the present invention where the switch's torsion plate has been tilted to a predetermined angle (e.g., 30°).

FIG. 3(b) is a schematic cross-sectional diagrammatic view of the second embodiment of a micromachined optomechanical switch in accordance with the present invention previously seen in FIG. 3(b).

FIG. 4 is a schematic diagram showing in perspective view a third embodiment of a micromachined optomechanical switch in accordance with the present invention where an external magnetic field—such as may be realized by depositing magnetic materials or permalloy on the torsion plate—is used to tilt the flat torsion plate to a predetermined angle. A vertical micromirror remains affixed to the torsion plate.

FIG. 5, consisting of FIG. 5(a) and FIG. 5(b), is a diagrammatic view of a "reshaping" of the torsion plate beam in order to impart bias, or tilt, to the angle between the torsion plate and the substrate.

FIG. 12 is a schematic view of the use of any embodiment of a micromachined optomechanical switch in accordance with the present invention in an N×M or N×N matrix switching array.

FIG. 13 is a schematic diagram illustrating the construction of a 3-bit delay line using 4×4 switches constructed from repeated copies of any embodiment of a micromachined optomechanical switch in accordance with the present invention.

DESCRIPTION OF THE PREFERRED EMBODIMENT

Figure 1A:
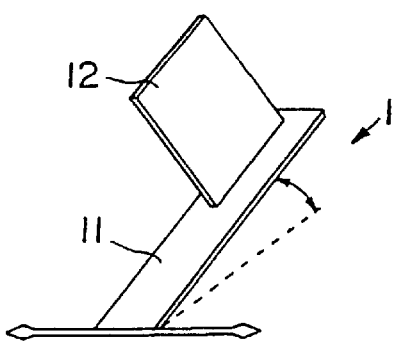
FIG. 1(a) a diagrammatic representation of a first embodiment of a micromachined optomechanical switch in accordance with the present invention where a micromachined plate, or torsion plate—which plate mounts an integrated micromirror—is mechanically hinged by microhinges to a substrate.

A first embodiment of a micromechanical, or MEMS, optomechanical switch 1 in accordance with the present invention is shown in FIG. 1(a). The switch 1 consists of a torsion plate 11 and an integrated vertical micromirror 12. The vertical micromirror 12 is integrated with the torsion plate through microhinges 13. See M. C. Wu, L. Y. Lin, S. S. Lee, and K. S. J. Pister, "Micromachined Free-Space Integrated Micro-Optics," in Sensors and Actuators: A. Physical, Vol. 50, pp. 127–134, 1995. See also K. S. J. Pister, M. W, Judy, S. R. Burgett, and R. S. Fearing, "Microfabricated Hinges, Sensors and Actuators." A. Physical, Vol. 33, pp. 249–255, 1992.

Figure 1B:
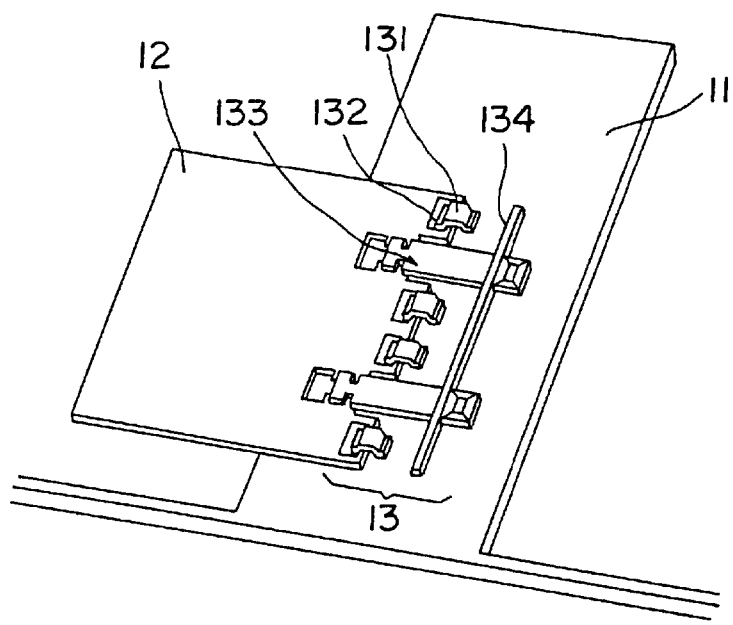
FIG. 1(b) a detail diagrammatic representation of the first embodiment of a micromachined optomechanical switch in accordance with the present invention previously seen in FIG. 1(a).

The details of the micromirror 12 before it is assembled to vertical position, and microhinge 13, are shown in the FIG. 1(b). Apertures along one straight edge of the micromirror 12 are captured under staples 131 that are affixed to the torsion plate 11. A hinge pin 132 permits the micromirror 11 to pivot relative to the torsion plate 11. When, during initial assembly, the micromirror 11 has pivoted to an upright, vertical, position then it is permanently captured in that position by engaging the distal end regions of spring-latches 133, The spring-latches 133 are biased in position by a torsion spring 134 at the proximal end region of each spring-latch 133.

Figure 2A:
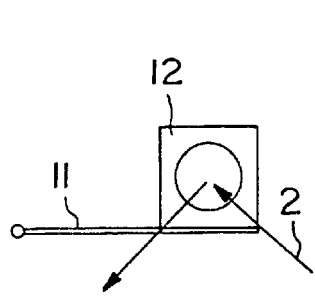
Figure 2B:
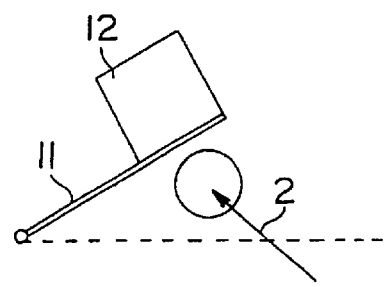
FIG. 2(b) shows the same switch in its transmission state.

Operation of the switch 1 is as illustrated in FIGS. 2(a) and 2(b). An input optical beam 2 is incident at 45° angle from the normal of the micromirror 12. By pivoting the torsion plate 11 the micromirror 12 is moved in and out of the optical path, switching the output optical beam between the reflection and the transmission directions, respectively. FIG. 2(a) shows the cross-sectional view of the switch 1 in its reflection state, and FIG. 2(b) in its transmission state. The torsion plate 11 is itself made of conducting material, including but not limited to polysilicon or aluminum. It is separated from a substrate (or bottom electrode) (not shown) by an insulating layer of a type including, but not limited to, silicon nitride.

In accordance with the present invention, the torsion plate 11 is actuated to pivot in position by an electrostatic force between itself and the substrate (or bottom electrode). The torsion plate 11 can alternatively, or also, be actuated by electromagnetic force generated by integrated coils on the torsion plate. See R. A. Miller, Y. C. Tai, G. Xu, J. Bartha, and F. Lin, "An Electromagnetic MEMS 2×2 Fiber Optic Bypass Switch," in Proc. International Conf. on Solid-State Sensors and Actuators (TRANSDUCERS 97), pp. 89–92, 1997. Electromagnetic torsion plates generally occupy large areas, and their fringing fields are not well confined, making them unsuitable for large matrix switches with dense switching elements.

The following sections deal with several ways of implementing the preferred electrostatic and magnetic torsion plate actuators.

1. A Optomechanical Switch Having a Tilted Torsion Plate with a Three-dimensional Supporting Structure FIG. 3(a) shows the schematic structure, and FIG. 3(b) the cross-sectional view, of a second embodiment switch 1a. In the optomechanical switch 1a a torsion plate 11a has been tilted to a predetermined angle (e.g., 30°). This "tilt bias" is accomplished by attaching the torsion plate 11a to a three-dimensional support structure 14 through a torsion beam 141. The three-dimensional structure 14 itself is realized by connecting three polysilicon plates 142–144 with loose microhinges. Only the microhinges 145 at the base of the torsion plate are anchored to the substrate (and only these microhinges 145 are shown in FIG. 3(a)). Other microhinges (not shown) only link the polysilicon plates together without connecting to the substrate. By pushing the loose end of the polysilicon plate, the originally flat polysilicon plates will buckle and will form the three-dimensional structure 14 as shown. Note that this assembly process can be performed by an on-chip microactuators, that is, the support structure can be self-assembled.

The structure of the switch embodiments 1 and 1a are different from the reported movable micromirror. See M. J. Daneman, O. Solgaard, N. C. Tien, K. Y. Lau, and R. S. Muller, "Laser-to-fiber coupling module using a micromachined alignment mirror," in IEEE Photonics Technology Letters, Vol. 8, pp. 396–8, 1996. It is also different from the reported microscanner. See M. H. Kiang, O. Solgaard, R. S. Muller, and K. Lau, "Micromachined Polysilicon Microscanners For Barcode Readers," IEEE Photonics Technology Letters, vol. 8, pp. 1707–1709, 1996. It is so different in the following ways.

First, the micromirror 12 is perpendicular to the torsion plates 11, 11a, and is preferably directly integrated on the torsion plate 11, 11a . Second, the micromirror 12 is parallel to the direction of motion and, therefore, the mirror angle does not vary with the angle of the torsion plate 11, 11a. Third, an electrostatic force between the torsion plate 11, 11a and the bottom electrode is used to actuate the torsion plate 11, 11a. Such an actuator can achieve full deflection with bistable operation, whereas previous microscanners driven by comb drive actuators can only achieve small angle scanning. See the Integrated Micro Electro Mechanical Systems (iMEMS) courses offered at Analog Devices, Inc., Cambridge, Mass. Fourth, this switching structure of the present invention combines low switching voltage with a large displacement of vertical micromirrors.

2. An Optomechanical Switch Actuated by a Magnetically Biased Torsion Plate

Instead of using three-dimensional structures to create a tilted torsion plate, it is possible to use external magnetic field to rotate the flat torsion plate to a predetermined angle. This can be accomplished by depositing magnetic materials or permalloy on the torsion plate, and integrating the vertical micromirror on the torsion plate. This structure is illustrated in FIG. 4. A magnetic field 15 generated by a magnetic material, or permalloy, 15 on or in the torsion plate 11b serves to bias the torsion plate 11b in position above the substrate (not shown).

Electrostatic actuation of polysilicon torsion plates with integrated permalloy layers have been demonstrated. See J. W. Judy, R. S. Muller, and H. H. Zappe, "Magnetic micro-actuation of polysilicon flexure structures," J. Microelectromechanical Systems, Vol. 4, pp. 162–169, 1995. The switch embodiment of FIG. 4 is different from the polysilicon torsion plates of the Judy, et ale reference in the following ways.

First, the permalloy torsion plate in the Judy, et al. reference is used to reflect light directly. Therefore, light incident in the plane of the substrate will be deflected out of the substrate plane. Such configuration is not desirable for optical switching because it is difficult to precisely control the torsion plate angle, and packaging of the out-of-plane beams is more difficult.

Second, the third embodiment switch 1b of the present invention shown in FIG. 4 employs a vertical micromirror 12 on the pivoting permalloy torsion plate 11b to reflect light. Therefore, the reflected optical beam remains parallel to the substrate. The reflected beam angle does not depend on the angle of the permalloy torsion plate 11b.

3. An Optomechanical Switch with A Reshaped Torsion Plate Actuator

Yet another, fourth, embodiment of a micromechanical, or MEMS, optomechanical switch 1c in accordance with the present invention is shown in FIG. 5, consisting of FIG. 5(a) and FIG. 5(b). The switch 1c employs a vertical micromirror 12 mounted on a tilted torsion plate 11c. The tilted torsion plate 11c is obtained by "reshaping" a straight torsion plate. This process of constructing a "reshaped" torsion plate is illustrated in FIG. 5.

First, a normal torsion plate (such as torsion plates 11a and 11b in FIGS. 1–4) is formed by the surface-micromachining process. The torsion plate 11c initially lies on the surface of the substrate. After releasing, the torsion plate 11c is rotated out of plane by either external force or by integrated microactuators. Then an external current 4 is passed through the torsion beam 11c, heating up the torsion beam 11c to above the temperature of plastic deformation. Permanent deformation (twisting) of the torsion beam is thus achieved.

This reshaping technology was first proposed by Fujita, et al. See Y. Fukuta, D. Collard, T. Akiyama, E. H. Yang, and H. Fujita, "Microactuated Self-Assembling of 3D Polysilicon Structures with Reshaping Technology," in Proc. IEEE Micro Electro Mechanical Systems (MEMS), pp. 477–481, 1997. The tilted torsion plate can then be actuated by electrostatic or electromagnetic force. The proposed switch differs from the reshaped structures reported by Fujita et al. in that the micromirror 12 is perpendicular to the torsion plate 11c, and is directly integrated with the torsion plate 11c.

4. An Optomechanical Switch with a Bent-Torsion-Plate Actuator

Figures 6A, 6B:
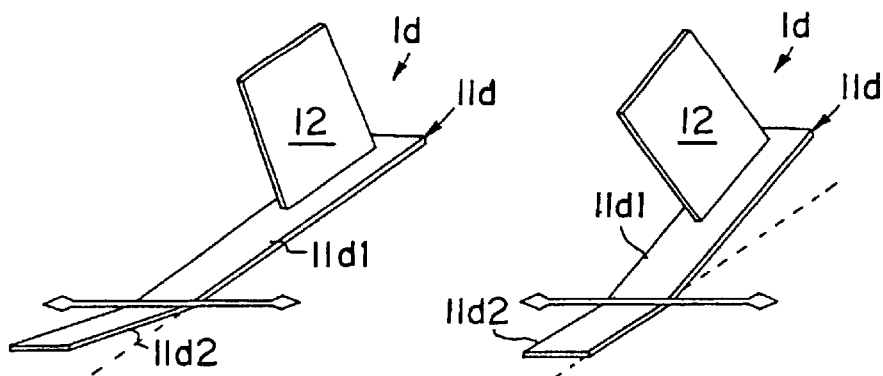
FIG. 6, consisting of FIG. 6(a) and FIG. 6(b), is a diagrammatic view of a fourth embodiment of a micromachined optomechanical switch in accordance with the present invention where the torsion plate actuator is bent.
Figures 7A, 7B:
FIG. 7, consisting of FIG. 7(a) and FIG. 7(b), is a diagram showing the operation of the bent-torsion-plate actuator of the fourth embodiment of the micromachined optomechanical switch previously seen in FIG. 6. When a voltage bias is applied between the secondary torsion plate and the bottom electrode (or substrate) then the secondary torsion plate is caused to contact the substrate while the primary torsion plate and its attached vertical micromirror are raised.

Yet another, fifth, embodiment of a micromechanical, or MEMS, optomechanical switch Id in accordance with the present invention is shown in FIG. 6, consisting of FIG. 6(a) and FIG. 6(b), and also again in FIG. 7, consisting of FIG. 7(a) and FIG. 7(b). The switch id employs a bent-torsion-plate actuator 11d. Two rigid plates 11d1, 11d2 are joined together at an angle and are connected to the same torsion beam to form the bent-torsion-plate actuator 11d. The torsion beam (not shown) is attached to a "primary torsion plate" 11d1, on which the vertical micromirror 12 is integrated. The "secondary torsion plate" 11d2 is bent upward and connected to the primary torsion plate 11d1 by either microhinges or reshaped torsion beams (not shown).

In the standby position (without applying bias), the primary torsion plate 11d1 is resting on some landing structures (not shown) on the substrate (not shown). When a voltage bias is applied between the secondary torsion plate 11d2 and the bottom electrode (or substrate), the secondary torsion plate 11d2 is caused to draw close to and contact the substrate, raising the primary torsion plate 11d2 and the attached vertical micromirror 12 as shown in FIG. 7(b). When the bias is removed, the switch 1d will return to the standby position by the restoring force of the torsion beams.

Because the primary torsion plate 11d1 and the secondary torsion plate 11d2 are usually shorted together electrically for the most common implementations, the bottom electrodes (not shown) under the primary and the secondary torsion plates 11d1, 11d2 should be separated. This opens up the additional possibility of separately biasing the primary and the secondary torsion plates 11d1, 11d2 for "push-pull" operation. Instead of simply relying on the restoring force of the torsion beams when returning to the standby state, a voltage bias applied between the primary torsion plate 11d1 and its bottom electrode (not shown) will accelerate the switching process.

Furthermore, the "push-pull" structure is effective in combating the "stiction" problem, i.e., when one of the torsion plates 11d1, 11d2 sticks to the substrate. The stiction issue is one of the most serious problems for surface-micromachined structures.

The push-pull structure is not limited to the configuration with separate bottom electrodes. If the primary and the secondary torsion plates 11d1, 11d2 are connected by some insulating materials (such as hard-baked photoresist or polymers), then they can share the same bottom electrode (e.g., the substrate).

In the absence of separate bottom electrodes and insulating layers between primary and secondary torsion plates 11d1, 11d2, the bias can be applied between the secondary plate 1d2 and the substrate by inserting a "shielding plane" between the primary plate 11d1 and the substrate. The shielding plane can be realized by a fixed conducting layer such as polysilicon.

5. An Optomechanical Switch with a Raised Torsion Plate Actuator

Instead of employing the bent-torsion plate 11d consisting of two separate rigid plates 11d1, 11d2, the same concept of switching also applies to simple flat torsion plates if the clearance between the torsion plate and the substrate is large enough. However, that clearance is determined by the thickness of the sacrificial material between the torsion plate and the substrate. In most surface-micromachining processes, that thickness is limited to a few micrometers. Therefore, the tilting angle is limited to a few degrees, which is not enough for optical switching applications. Though the tilting angle can be increased by increasing the thickness of the sacrificial materials, this is at the expense of more complicated fabrication process and non-trivial step-coverage problems (i.e., the structural layer becomes discontinuous when it goes through a large step).

One co-inventor of the present invention and his colleagues have recently proposed a novel "micro-elevator" structure realized by the surface-micromachining technique. This "microelevator" structure can raise up a structural plate (e.g., polysilicon) vertically without lateral motion. See L. Fan, M. C. Wu, K. Choquette, and M. H. Crawford, "Self-Assembled Microactuated XYZ Stages for Optical Scanning and Alignment," Proc. 1997 International Conferences on Solid-State Sensors and Actuators (Transducers 97), Paper 2A2. 01, 1997.

Figure 8A:
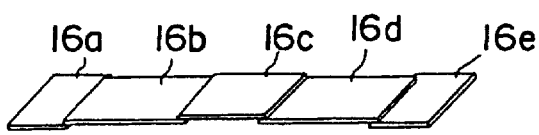
FIG. 8, consisting of FIG. 8(a) through FIG. 8(c), is a diagrammatic view of a fifth embodiment of a micromachined optomechanical switch in accordance with the present invention where a "micro-elevator" is used to accentuate motion of a micromirror.
Figure 8B:
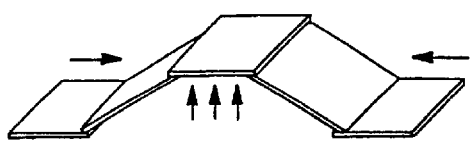
Figure 8C:
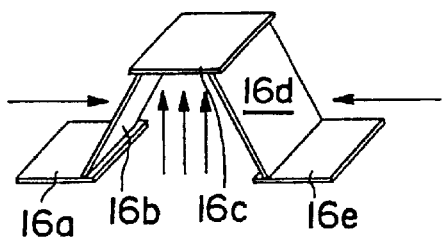

The concept of a "micro-elevator" is illustrated in FIG. 8. In its simplest realization, five polysilicon plates 16a–16e are connected together by loose microhinges (not shown). These microhinges can only rotate in one direction. For example, the microhinges between the two outer plates 16a and 16b, 16d and 16e, can only bent upwards, whereas the microhinges connected to the center plate 16c can only bent downwards. Therefore, by pushing the whole structures from the two outer polysilicon plates 16a, 16e—if desired with integrated microactuators—the center plate 16c will first buckle upward and then raise up vertically.

The micro-elevator technology is very effective for creating suspended structures with arbitrary spacing between the structure and the substrate. It does not require thick sacrificial layers. Instead, standard surface-micromachining process can be used, which potentially reduces the manufacturing cost.

Figure 9:
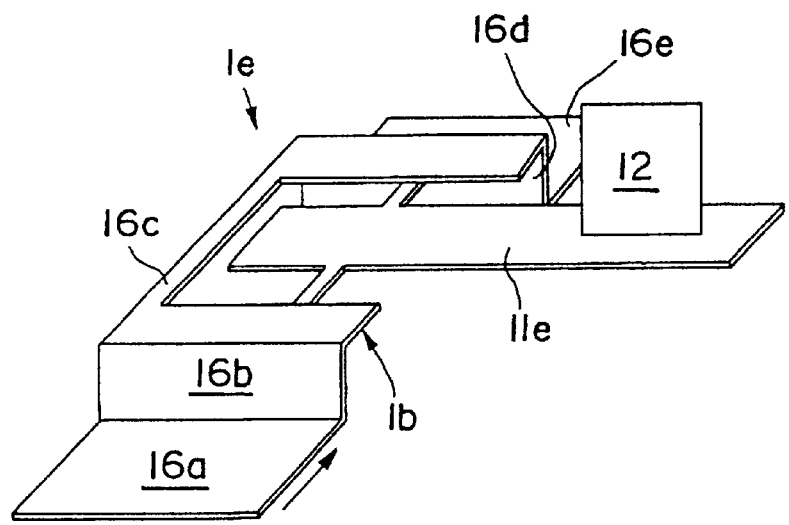
FIG. 9 is a diagrammatic view of a sixth embodiment of a micromachined optomechanical switch in accordance with the present invention using both the "micro-elevator" shown in FIG. 8 and a torsion plate attached to the raised structural plate of the micro-elevator. The vertical micromirror remains integrated onto the torsion plate.

A sixth embodiment of the optical switch le can be realized by employing a torsion plate 11e in combination with the micro-elevator 16, as shown in FIG. 9. The torsion plate 11e is attached to the raised structural plates 16b–16d of the micro-elevator 16, and the vertical micromirror 12 is integrated onto the torsion plate 11e. By applying a voltage between the torsion plate 11e and the bottom electrode 171 of the substrate 17 (both shown in FIG. 10), the micromirror 12 will be pulled upward, as shown in FIG. 10(b).

Note that in this structure there is no need for insulating layer between the bottom electrode 171 and the torsion plate 11e. A landing electrode 172 biased at the same voltage as the torsion plate 11e can be employed to stop the rotation of the torsion plate 11e without shorting to the bottom electrode 171. This permits the structure to be fabricated with a standard three-polysilicon-layer surface-micromachining process such as the process offered by MCNC (the MEMS Technology Applications Center at Microelectronics Center at North Carolina (MCNC), Research Triangle Park, N.C.) or by Analog Devices, Cambridge, Mass. (See information concerning the Integrated Micro Electro Mechanical Systems (iMEMS) services offered at Analog Devices, Inc. at the Analog Devices website). Again, the main advantage in the switch 1e is the large tilting angle achieved through the use of the micro-elevator 16.

6. Push-Pull Operation of An Optomechanical Switch

Figure 10A:
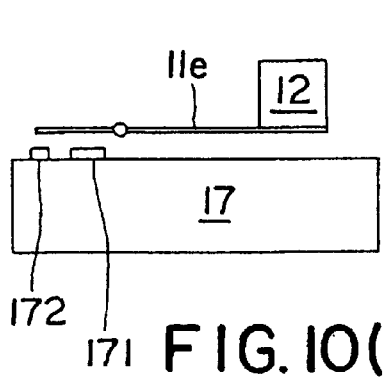
FIG. 10, consisting of FIG. 10(a) and FIG. 10(b), is a diagrammatic view of the operation of the sixth embodiment of the micromachined optomechanical switch previously seen in FIG. 9. A voltage applied between the torsion plate and the bottom electrode will cause the micromirror to be pulled upward, as shown.
Figure 10B:
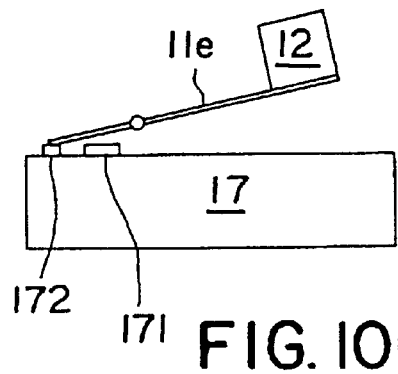

The "push-pull" actuation can readily be applied to the embodiment 1e of the switch seen in FIGS. 9 and 10. By adding a separate bottom 11e ctrode on the same side of the torsion plate 11e as is the micromirror 12 (this 11e electrode not shown), electrostatic force can be employed for both switching directions. The raised torsion plate structure is also advantageous for relieving the stiction issue since there are minimum contact areas between the torsion plate 11e and the substrate 17 and the large spacing between them.

It should also be mentioned that the micro-elevator 16 can be completely self-assembled, that is, the structural plates 16b–16d can be raised by applying bias to the on-chip microactuators pushing the outer plates 16a, 16e. No mechanical or manual assembly is needed. This is very important in reducing the production cost of the switch 1e.

7. An Optomechanical Switch with a Raised "Micro Flap" Actuator

Figure 11A:
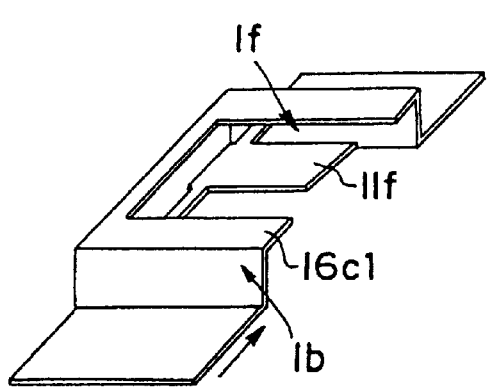
FIG. 11, consisting of FIG. 11(a) and FIG. 11(b), is a diagrammatic view of a seventh embodiment of the micromachined optomechanical switch in accordance with the present invention where the torsion plate is cut out from the platform of the micro-elevator, and is suspended from the substrate in the assembled "micro-elevator".
Figure 11B:
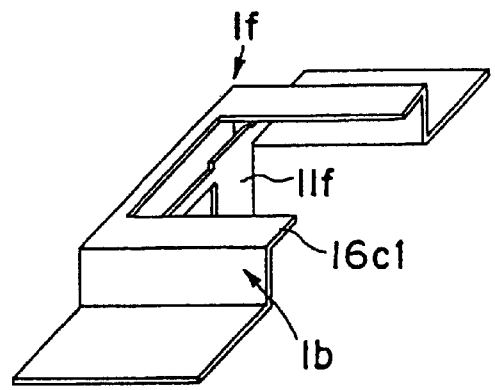

The "micro flap" MEMS fiber optic switch if is shown in FIG. 11. It also employs the general structure of the "micro elevator" 16 previously seen in FIGS. 9 and 10. The torsion plate 11f is cut out from the platform 16c1 of the micro-elevator 16. When the micro-elevator 16 is assembled, the torsion plate 11f is suspended from the substrate 17 (not shown in FIG. 11, shown in FIG. 10). By applying a voltage between the substrate 17 and the torsion plate 16c1, a "micro flap" of the platform 16c is attracted downward. When it is rotated by 90°, the incident light is reflected to the outputs (which are normally optical fibers) in the orthogonal directions. This micro flap cut from the platform 16c1 of the "micro-elevator" 16 differs from all other micro flaps in that the separation between the structural layer and the substrate is not limited by the thickness of the sacrificial layers. Therefore, a large switching angle (up to 90°) can be achieved.

The switching angle can either be defined by either a mechanical stop or an electric bias control.

8. N×M Matrix Switches, and Networks, Made from Optomechanical Switches in Accordance With the Present Invention All the embodiments of switches 1 through 1f discussed above can be repeated to form N×M or N×N matrix switching arrays, as is shown in FIG. 12. The matrix switch is basically an optical crossbar switch, which is non-blocking and which has simple control. The MEMS optical switches 1 through 1f discussed above all have very small footprint and are therefore particularly suitable for implementing large matrix switches with high density of switching cells. Previous optomechanical switches have shown severe difficulty in implementing large crosspoints in a small volume, and the switches have not been made reliably rugged and robust to environmental effects and are extremely difficult to hermetically seal.

Switches in accordance with the present invention can also be applied to switching architectures other than matrix switches, including but not limited to Benes, Clos and other networks. In addition to telecommunication networks and network restoration, switches in accordance with the present invention are also very useful for optical signal processing, such as true time delay for phased array radar. See Ng, W.; Walston, A. A.; Tangonan, G. L.; Lee, J. J.; Newberg, I. L.; Bernstein, N. The first demonstration of an optically steered microwave phased array antenna using true-time-delay. Journal of Lightwave Technology, vol. 9, (no. 9), September 1991, p. 1124–31. Line 24–27, p. 22. The true time delay network consists of one or more variable delay lines. FIG. 13 illustrates the schematic diagram of a 3-bit delay line using a 4×4 array of switches in accordance with the present invention.

9. A Spring-loaded Landing Electrode for MEMS Optical Switches and Devices

In addition to the basic switch structures, certain particular MEMS structures preferred in the optomechanical switches of the present invention are very useful for optimal operation of the switches. A first of these MEMS structures is a spring-loaded landing electrode.

One of the most important issues of such MEMS optical switches is stiction. Stiction is most serious when the torsion plate is in contact with the substrate. There are several commonly used methods to reduce stiction, such as the use of dimples (or rough surface) to reduce the contact areas, and surface passivation using self-assembled monolayer (SAM) coatings. See R. Maboudian and R. T. Howe, "Stiction reduction processes for surface micromachines," Tribology Letters, vol. 3, p. 215–221, 1997.

Figure 14A:
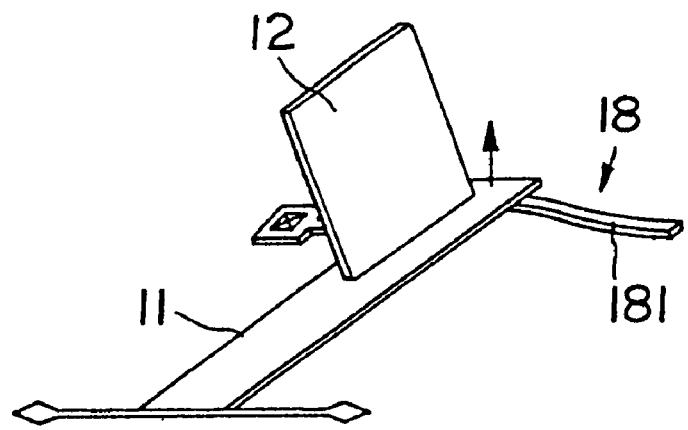
FIG. 14(a) is a diagrammatic perspective view of a spring-loaded landing electrode, serving to reduce any stiction of the torsion plates, in accordance with the present invention.
Figure 14B:
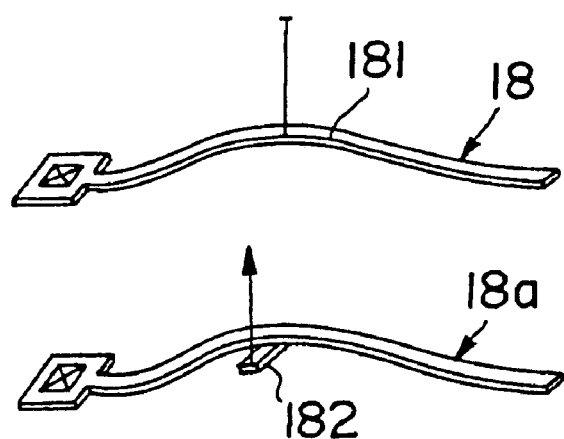
FIG. 14(b) is a diagrammatic perspective view of a variant of the spring-loaded landing electrode previously seen in FIG. 14(b).

The present invention contemplates a new, spring-loaded, landing electrode to reduce the stiction of the torsion plates. The schematic diagram of the new spring-loaded landing electrode 18 is shown in FIGS. 14(a) and 14(b). The spring-loaded landing electrode 18 consists essentially of a buckled polysilicon beam 181, which can be achieved by pushing a single-side-clamped polysilicon beam. After the beam 181 is buckled, the open end of the beam can be fixed by locking it into some micromachined structures (not shown). The buckled beam 181 therefore provides the necessary upward spring force when the torsion plate 11 is released from the substrate (not shown). The ideal spring-loaded landing electrode 18 should satisfy the following two conditions: The spring constant of the landing electrode should be much larger than that of the torsion beam so that the restoring force is much stronger that from the torsion beam, and the spring should be depressed only when the torsion plate is almost contacting the substrate so that this additional spring does not increase the pull-in voltage of the torsion plate. These two conditions are readily satisfied by properly designed buckled beams.

A variant spring-loaded landing electrode 18a shown in FIG. 14(b) add a short bending spring 182 at the center of the buckled beam 181. When the torsion plate 11 (shown in FIG. 14(a)) snaps towards the substrate (not shown) due to the pull-in phenomena, it will press against the short beam 182 and bend it downward. The bent beam 181 can thus provide the necessary spring force to kick back the torsion plate 11 when the bias is released.

10. A Torsion Microhinge for MEMS Optical Switches and Devices

Another new MEMS structure useful in implementing the optomechanical switches of the present invention is a torsion microhinge.

Currently, there are two types of hinges for joining a structural plate with substrate or two structural plates: (1) torsion hinges and (2) rotation hinges (microhinges). See K. S. J. Pister, M. W. Judy, S. R. Burgett, and R. S. Fearing, Microfabricated Hinges, Sensors and Actuators A, Vol. 33, pp. 249–256, 1992. The microhinge has a well-defined rotation axis, however, the hinge pin can often be trapped in the parasitic gap of the hinge staple. This increases the resistance for rotation, and can often break the weak hinge pin.

In accordance with the present invention, a new type of hinge combines the advantages of torsion hinges and microhinges. This hinge consists of a torsion hinge and a confining staple. The displacement of the hinge pins is now constrained by the torsion beam. Trapping and breakage of the hinge pins are therefore eliminated. Compared with conventional torsion beams, the hinged torsion beams has the advantage of limiting the lateral displacement of the hinges.

In accordance with the preceding explanation, variations and adaptations of the micromachined optomechanical switches and switch components in accordance with the present invention will suggest themselves to a practitioner of the MEMS arts.

In accordance with these and other possible variations and adaptations of the present invention, the scope of the invention should be determined in accordance with the following claims, only, and not solely in accordance with that embodiment within which the invention has been taught.

What is claimed is:

1. A MEMS optomechanical switch comprising:
    a substrate;
    a signal source capable of transmitting a radiation signal;
    an electrode coupled to the substrate;
    a micromachined plate rotatably coupled to the substrate about a pivot axis;
    a micromirror having an orientated reflective surface, the micromirror being mounted to the micromachined plate such that the orientation of the reflective surface relative to the radiation signal is substantially constant as the micromachined plate rotates about the pivot axis; and
    an electrical source coupled to at least one of the electrode and the micromachined plate, such that an electrical force can be generated between the electrode and the micromachined plate, and wherein the micromachined plate rotates about the pivot axis due to the generation of the electrical force.

2. The MEMS optomechanical switch of claim 1, wherein the micromachined plate is mechanically hinged to the substrate.

3. The MEMS optomechanical switch of claim 2, wherein the micromachined plate is mechanically hinged to the substrate via a torsion hinge.

4. The MEMS optomechanical switch of claim 1, further comprising a landing electrode positioned to prevent the micromachined plate from contacting at least one of the substrate and the electrode.

5. The MEMS optomechanical switch of claim 4 wherein the landing electrode comprises a buckled beam.

6. The MEMS optomechanical switch of claim 1, wherein the electrical force is an elecrostatic force.

7. The MEMS optomechanical switch of claim 1, wherein the electrical force is a magnetic force.

8. The MEMS optomechanical switch of claim 1, wherein the radiation signal is a beam of light.

9. The MEMS optomechanical switch of claim 1, wherein the radiation signal is a laser light.

10. The MEMS optomechanical switch of claim 1, wherein the reflective surface is substantially along a single plane having a normal to the plane, wherein the radiation signal and the normal to the single plane define a reflective angle, and wherein the reflective angle remains substantially constant as the micromachined plate rotates about the pivot axis.

11. A MEMS optomechanical switch comprising:
    a substrate; an electrode coupled to the substrate;
    a micromachined plate rotatably coupled to the substrate about a pivot axis, the micromachined plate and electrode being capable of generating an electrical force therebetween:
    a micromirror having an orientated reflective surface, wherein the micromirror is mounted to the micromachined plate; and
    a landing electrode positioned to prevent the micromachined plate from contacting at least one of the substrate and the electrode.

12. The MEMS optomechanical switch of claim 11, further comprising a signal source capable of transmitting a radiation signal, and wherein the orientation of the reflective surface relative to the radiation signal is substantially constant as the micromachined plate rotates about the pivot axis.

13. The MEMS optomechanical switch of claim 12, further comprising an electrical source coupled to at least on of the electrode and the micromachined plate, such that an electrical force can be generated between the electrode and the micromachined plate.

14. The MEMS optomechanical switch of claim 13, wherein the micromachined plate rotates about the pivot axis due to the generation of the electrical force.

15. The MEMS optomechanical switch of claim 14, wherein the landing comprises a buckled beam.

16. A MEMS optomechanical switch comprising:
    a substrate; a signal source capable of transmitting a radiation signal;
    an electrode coupled to the substrate;
    a micromachined plate rotatable coupled to the substrate about a pivot axis;
    a micromirror having a reflective surface, the micromirror being mounted to the micromachined plate, wherein the reflective surface is substantially along a single plane having a normal to the plane, wherein the normal to the single plane is substantially aligned with the pivot axis; and
    an electrical source coupled to at least on of the electrode and the micromachined plate, such that an electrical force can be generated between the electrode and the micromachined plate, and wherein the micromachined plate rotates about the pivot axis due to the generation of the electrical force.

17. The MEMS optomechanical switch of claim 16, wherein the micromachined plate is mechanically hinged to the substrate.

18. The MEMS optomechanical switch of claim 17, wherein the micromachined plate is mechanically hinged to the substrate via a torsion hinge.

19. The MEMS optomechanical switch of claim 16, further comprising a landing electrode positioned to prevent the micromachined plate from contacting at least one of the substrate and the electrode.

20. The MEMS optomechanical switch of claim 19, wherein the landing electrode comprises a buckled beam.

* * * * *